US012066570B2

(12) United States Patent
Rambach et al.

(10) Patent No.: US 12,066,570 B2
(45) Date of Patent: Aug. 20, 2024

(54) HYBRID EVALUATION OF RADAR DATA FOR CLASSIFYING OBJECTS

(71) Applicant: Robert Bosch GmbH, Stuttgart (DE)

(72) Inventors: Kilian Rambach, Stuttgart (DE); Lisa-Kristina Morgan, Talheim (DE); Adriana-Eliza Cozma, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 497 days.

(21) Appl. No.: 17/366,511

(22) Filed: Jul. 2, 2021

(65) Prior Publication Data
US 2022/0011403 A1   Jan. 13, 2022

(30) Foreign Application Priority Data
Jul. 8, 2020   (DE) .......................... 102020208544.7

(51) Int. Cl.
*G01S 7/41*   (2006.01)
*G01S 13/931*   (2020.01)

(52) U.S. Cl.
CPC .............. *G01S 7/411* (2013.01); *G01S 7/417* (2013.01); *G01S 13/931* (2013.01)

(58) Field of Classification Search
CPC ................................. G01S 7/411; G01S 7/417
See application file for complete search history.

(56) References Cited

U.S. PATENT DOCUMENTS

| 5,613,039 | A | * | 3/1997 | Wang | G06N 3/049 706/31 |
|---|---|---|---|---|---|
| 10,205,457 | B1 | * | 2/2019 | Josefsberg | H03L 7/091 |
| 11,340,332 | B2 | * | 5/2022 | Cho | G01S 13/345 |
| 2020/0408879 | A1 | * | 12/2020 | Mayer | G01S 13/343 |
| 2020/0408890 | A1 | * | 12/2020 | Klar | G01S 13/878 |
| 2021/0199787 | A1 | * | 7/2021 | Emadi | G01S 13/931 |
| 2021/0199788 | A1 | * | 7/2021 | Emadi | G01S 13/42 |
| 2021/0200209 | A1 | * | 7/2021 | Mostajeran | G07C 5/085 |
| 2021/0286923 | A1 | * | 9/2021 | Kristensen | G01S 7/412 |

FOREIGN PATENT DOCUMENTS

| DE | 102014114350 A1 | 4/2015 |
|---|---|---|
| DE | 102017208718 A1 | 11/2018 |
| DE | 102018222195 A1 | 6/2020 |
| EP | 3349038 A1 | 7/2018 |
| JP | 2012145444 A | 8/2012 |

\* cited by examiner

*Primary Examiner* — Marcus E Windrich
(74) *Attorney, Agent, or Firm* — NORTON ROSE FULBRIGHT US LLP; Gerard A. Messina

(57) ABSTRACT

A method for classifying objects based on measured data recorded by at least one radar sensor. In the method, a frequency spectrum of time-dependent measured data of the radar sensor is provided; from this frequency spectrum, locations from which reflected radar radiation has reached the radar sensor are ascertained; at least one group of such locations belonging to one and the same object is ascertained; for each location in this group, a portion of the frequency spectrum that corresponds to the radar radiation reflected from this location is ascertained; all these portions for the object are aggregated and are fed to a classifier; the object is assigned by the classifier to one or multiple classes of a predefined classification.

16 Claims, 2 Drawing Sheets

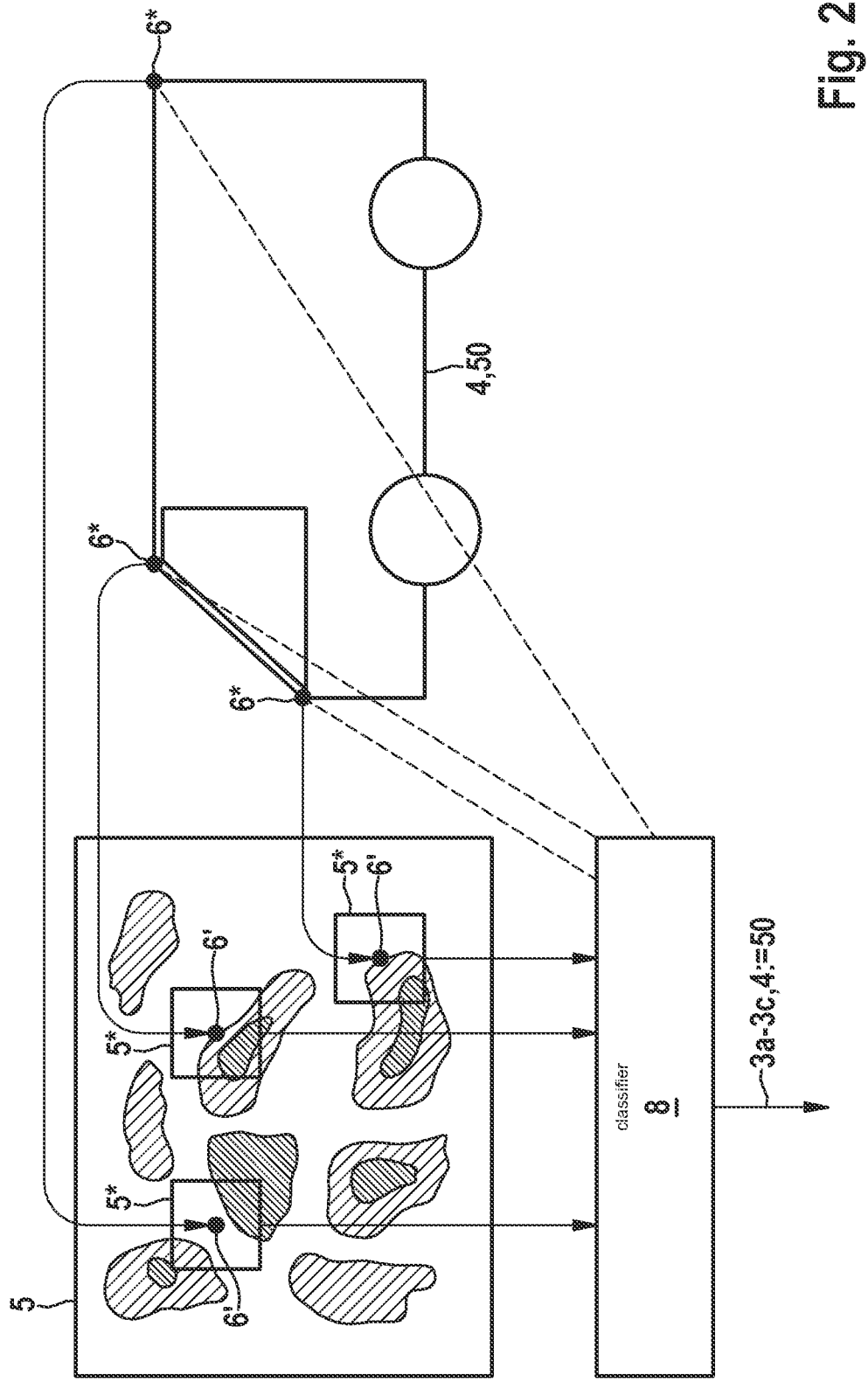

HYBRID EVALUATION OF RADAR DATA FOR CLASSIFYING OBJECTS

CROSS REFERENCE

The present application claims the benefit under 35 U.S.C. § 119 of German Patent Application No. DE 102020208544.7 filed on Jul. 8, 2020, which is expressly incorporated herein by reference in its entirety.

FIELD

The present invention relates to the evaluation of radar data for classifying objects, the presence of which is indicated by these radar data.

BACKGROUND INFORMATION

For a vehicle to be able to move in an at least semi-automated manner in road traffic, it is necessary to detect the surroundings of the vehicle and to initiate countermeasures if there is a threat of collision with an object in the surroundings of the vehicle. For safe automated driving, it is also necessary to create a surroundings representation and localization.

Detecting objects with the aid of radar does not depend on the lighting conditions and is possible for example even at night over a relatively large distance without the oncoming traffic being blinded by high beams. Furthermore, the radar data also directly indicate the distance and speed of objects. This information is important for assessing whether there may be a collision with the objects. However, the type of object may not be recognized directly from radar signals. This recognition is presently achieved by calculating attributes from digital signal processing.

German Patent Application No. DE 10 2018 222 195 A1 describes a method for locating or classifying objects on the basis of radar data. This method uses a convolutional neural network to classify the detected objects based on a frequency representation of the radar data.

SUMMARY

Within the scope of the present invention, a method is provided for classifying objects based on measured data recorded by at least one radar sensor.

In accordance with an example embodiment of the present invention, in this method, initially a frequency spectrum of time-dependent measured data from the radar sensor is provided. The frequency spectrum may be ascertained for example by a Fourier transform from the time-dependent measured data. However, the radar sensor used may also for example already output a frequency spectrum.

From the frequency spectrum, locations from which reflected radar radiation has reached the radar sensor are ascertained. For this purpose, use may be made for example of a detector that has a constant false alarm rate (CFAR) and, for the events output by this detector, the angle at which the reflected radar radiation has arrived may be estimated in each case.

At least one group of such locations belonging to one and the same object is ascertained. In particular, this may be accomplished for example by clustering under the hypothesis that at least one particular object is present.

For each location in this group, a portion of the frequency spectrum that corresponds to the radar radiation reflected from this location is ascertained. All these portions for the object are aggregated and are fed to a classifier. The object is assigned by the classifier to one or multiple classes of a predefined classification. This means that in particular a type of the object, such as for example a tree, house, pedestrian, passenger car, truck, or lane boundary, may be ascertained.

It has been found that in this way the classifier may be designed with a significantly lower resource requirement and requires much less computing time. The reason for this is that the classifier is not fed the entire frequency spectrum all at once, but instead only a small fraction of this frequency spectrum. In particular, a setting in which multiple objects are located may be successively classified. For this purpose, the groups of locations with radar reflexes indicating the presence of different objects are processed one after the other. The class assignment of the object, the presence of which is indicated by the group, is thus obtained for each of these groups.

The classifier is therefore also easier to train since the classifier only has to learn to recognize individual objects, but not interactions that may occur when attempting to recognize multiple objects simultaneously.

In one particularly advantageous embodiment of the present invention, based on the group, more of the locations from which reflected radar radiation has reached the radar sensor are selected. The selection depends on the extent to which it is plausible that the object characterized by the group has also reflected radar radiation from the additional location in question. Also for these additional locations, portions of the frequency spectrum are ascertained and included in the aggregation. Clustering, which divides the total amount of locations into groups, aims to find dividing lines between these groups which are plausible on average. This means that, in some cases, locations whose assignment to an object would still have been useful are no longer assigned to this object when clustering. Since additional locations are selected using the cluster, this effect is at least partially compensated. The fact that too many locations may be selected and therefore unnecessary portions of the frequency spectrum may be included in the aggregation is not further critical for the result of the classification.

In another particularly advantageous embodiment of the present invention, the locations for which portions of the frequency spectrum have been aggregated, and/or other features of radar reflexes received from these locations, are fed to the classifier together with the portions of the frequency spectrum. These other features may include for example the radar cross-section (RCS) and/or at least one angle (azimuth and/or elevation relative to the measuring location). The spatial information, and/or the information from the other features, and the information from the frequency spectrum may then interact particularly well so that the classifier may resolve the respective ambiguities of these two pieces of information and identify the object as unambiguously as possible and optimally resolve discrepancies. For example, the frequency spectrum also provides information as to whether the radar radiation coming from a particular location is rather reflected on an edge or on a surface. Furthermore, the frequency spectrum also depends on whether the radar radiation was rather reflected on a soft material or on a hard material. Some traffic-relevant objects, such as for example a bicycle with a rider, who in turn is wearing a helmet, may also be composites of soft and hard materials.

Advantageously, the frequency spectrum is provided as a distance-speed representation. These are the coordinates that are particularly important for an evaluation with regard to traffic-relevant objects. If the radar sensor does not provide the frequency spectrum directly as a distance-speed representation, it may be transformed into these coordinates. In particular, a representation in the coordinates distance and speed may, for example, form a common denominator for measured data recorded by different sensors. The classifier then only needs to be trained on the processing of a frequency spectrum in the coordinates distance and speed.

In one particularly advantageous embodiment of the present invention, measured data that have been recorded using radar radiation of the modulation type Joint Sampling Frequency Modulated Continuous Wave, JSFMCW, are selected. An ambiguity regarding the speed is resolved using any arbitrary additional piece of information. Compared to the modulation type Frequency Modulated Continuous Wave, FMCW, which produces "chirps" with a frequency that increases or decreases linearly during the emission, this has the advantage that less complex hardware is required. Measured data recorded using JSFMCW therefore have an ambiguity regarding the speed. However, since this ambiguity is resolved, the advantage of the lower hardware complexity may be achieved and nevertheless a distance-speed representation of the measured data that is useful for the classification may still be obtained.

In another particularly advantageous embodiment of the present invention, at least one portion of the frequency spectrum included in the aggregation is a detail that is rectangular in the coordinates of the frequency spectrum. In particular, this detail may be centered for example around coordinates belonging to a reflection location on the object. As explained above, the change in the radar reflection within an area delimited in this way may be used to analyze what specifically the radar radiation has been reflected on at that location. The details ("patches") for all locations selected as belonging to the object to be then classified together form a frequency spectrum that is significantly data-reduced compared to the original frequency spectrum, containing only the portions that are relevant for the analysis of precisely this object. This reduced frequency spectrum may then be pre-processed in any way for the classifier, for example by trimming to a certain number of bins in each coordinate or by transforming units of measurement and/or dynamic ranges.

In another particularly advantageous embodiment of the present invention, the aggregated portions of the frequency spectrum are transformed into at least one distance-speed representation before being fed to the classifier. An ambiguity regarding the speed in the at least one distance-speed representation may then optionally be resolved, again using an additional piece of information. Transforming only the aggregated portions, instead of the entire frequency spectrum, saves computing time. Furthermore, the representation of the aggregated portions in distance-speed coordinates may be simpler and/or clearer for further processing.

A joint processing of the locations at which a particular object has reflected radar radiation and for which portions of the frequency spectrum have therefore been aggregated, and/or of the other features of the radar reflexes, on the one hand and of the portions of the frequency spectrum on the other hand may be implemented in various ways in a classifier. Three possibilities are indicated below by way of example.

In one particularly advantageous embodiment of the present invention, the portions of the frequency spectrum are fed to a first neural network in the classifier. The associated locations, and/or the other features of the radar reflexes, are fed to a second neural network in the classifier. The first neural network and the second neural network merge in the classifier to form a joint neural network.

The parts of the two neural networks that have not yet merged together may then recognize, for example, particular features and patterns in the distribution of the locations and/or other features, and/or in the frequency spectrum. In the aforementioned example of a cyclist as the object, for example, the first neural network might recognize that the object is a composite of soft portions (rider) and hard portions (bicycle and helmet). The second neural network might recognize the silhouette of a bicycle. The joint, merged part of the network may then for example resolve ambiguities and discrepancies.

In particular, the parts that have not yet merged together may for example bring the recognized features and patterns to a common level of abstraction, so that these features and patterns may be weighed against each other and offset against each other in the merged part of the network. The fact that the recognized features and patterns have been obtained from very different types of data is then no longer of significance in the merged part.

Since the two networks are not merged with one another until later, the parts that have not yet been merged may in particular have for example different architectures tailored to the processing of the different types of data.

By way of example, a convolutional neural network may be selected as the first neural network for processing the portions of the frequency spectrum. Such a network is particularly suitable for gradually reducing the dimensionality of high-dimensional data, i.e., frequency spectra, and mapping these to a very low-dimensional result (for instance an assignment to one or multiple classes).

In contrast, a neural network having a PointNet architecture for example may be selected for processing the locations from which the object has reflected radar radiation, or the further features of the radar reflexes.

In another advantageous embodiment of the present invention, the portions of the frequency spectrum on the one hand and the locations, or the further features of the radar reflexes, on the other hand are simultaneously fed to the classifier in different channels of one and the same input. If, for example, the classifier is designed to process image data, then an input image for the classifier may be put together from a first color channel containing the portions of the frequency spectrum and a second color channel containing the locations to which these portions relate, or further features of the radar reflexes. In the same way, inputs for classifiers that may be divided into multiple channels, other than images, may be put together from portions of the frequency spectrum on the one hand and locations, or other features of the radar reflexes, on the other hand.

In another advantageous embodiment of the present invention, the portions of the frequency spectrum are fed to a first layer of a neural network in the classifier. The locations for which these portions have been aggregated, or the further features of the radar reflexes, are fed to a deeper layer of the same neural network. In this way, for example, the high-dimensional portions of the frequency spectrum may be brought to a level of abstraction at which the location coordinates of the reflection locations, or the further features of the radar reflexes, are already there from the outset. The two types of data may then be brought together in the neural network.

In particular, an activation signal may be formed for example from the assignment to one or multiple classes as ascertained by the classifier, and the vehicle may be controlled using this activation signal. In particular, this may be used to pursue the aim of adapting the trajectory of the vehicle in such a way that it does not intersect the trajectories of objects that have been recognized in a traffic situation.

The method may in particular be entirely or partially computer-implemented. Therefore, the present invention also relates to a computer program containing machine-readable instructions which, when executed on one or multiple computers, prompt the computer(s) to carry out the described method. Control devices for vehicles and embedded systems for technical devices, which are likewise capable of executing machine-readable instructions, are also to be regarded as computers in this sense.

The present invention also relates to a machine-readable data medium and/or to a download product including the computer program. A download product is a digital product that is transferrable via a data network, i.e., downloadable by a user of the data network, which may be offered for sale for example in an online shop for immediate download.

Furthermore, a computer may also be equipped with the computer program, with the machine-readable data medium and/or with the download product.

Further measures which improve the present invention will be presented in greater detail below together with the description of the preferred embodiments of the present invention, with reference to figures.

BRIEF DESCRIPTION OF THE DRAWINGS

FIG. 2 illustrates the linking of locations 6*, which belong to one and the same object 4, to portions 5* of frequency spectrum 5, in accordance with an example embodiment of the present invention.

DETAILED DESCRIPTION OF EXAMPLE EMBODIMENTS

Figure 1:
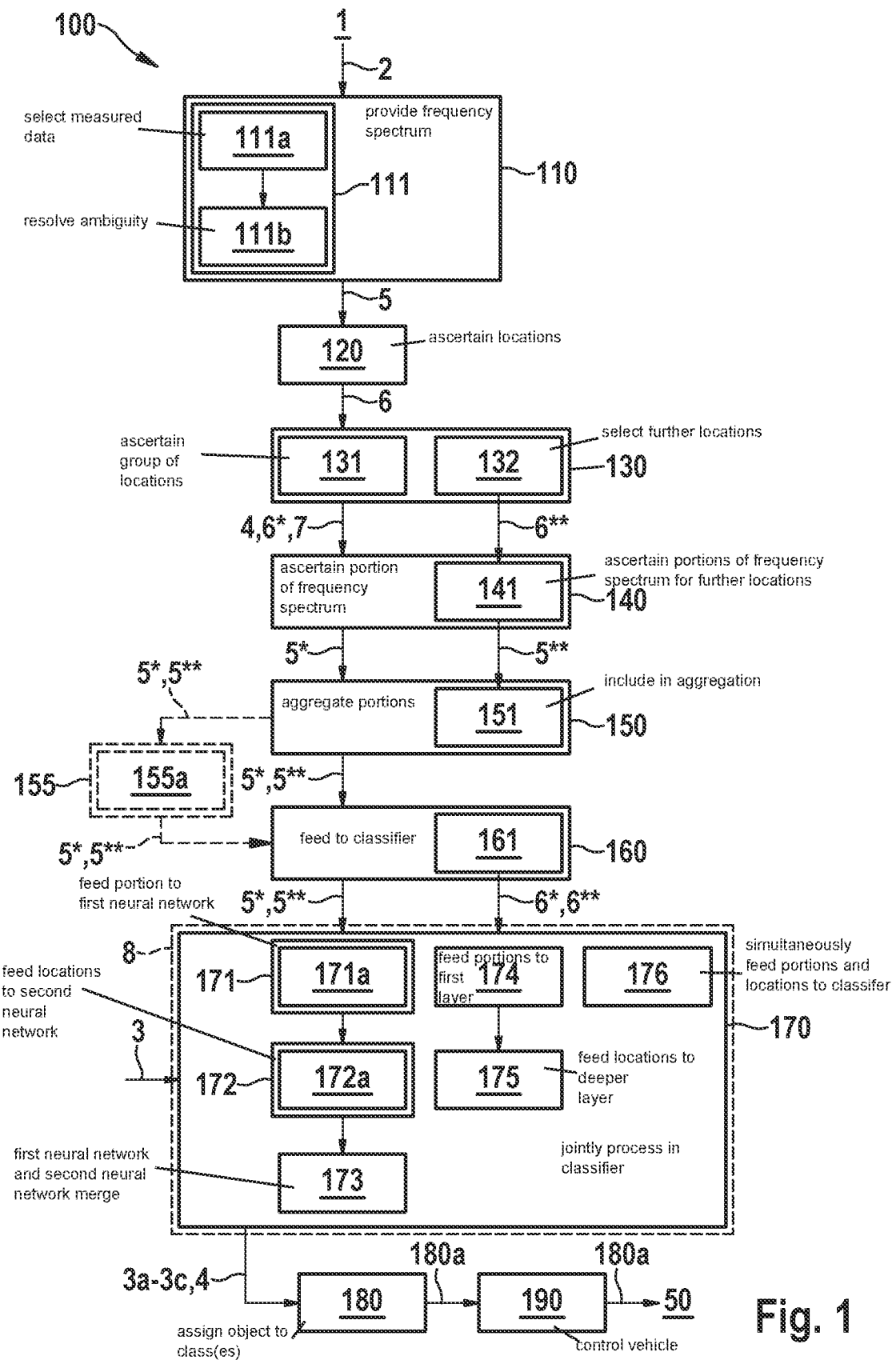
FIG. 1 shows an exemplary embodiment of method 100 for classifying objects 4, in accordance with the present invention.

FIG. 1 is a schematic flowchart of an exemplary embodiment of method 100 for classifying measured data 2 recorded by at least one radar sensor 1, in accordance with the present invention.

In step 110, a frequency spectrum 5 of time-dependent measured data 2 from radar sensor 1 is provided. According to block 111, this frequency spectrum 5 may in particular be provided for example as a distance-speed representation. According to block 111a, measured data 2 recorded using radar radiation of modulation type JSFMCW may in particular be selected for example. According to block 111b, an ambiguity of these measured data 2 regarding the speed may then be resolved using any arbitrary additional piece of information.

In step 120, from this frequency spectrum 5, locations 6 from which reflected radar radiation has reached radar sensor 1 are ascertained. In step 130, at least one group 7 of such locations 6* belonging to one and the same object 4 is ascertained. In step 140, for each location 6* in this group 7, a portion 5* of frequency spectrum 5 that corresponds to the radar radiation reflected from this location 6* is ascertained. All these portions 5* for object 4 are aggregated in step 150 and are fed to a classifier 8 in step 160. In step 170, object 4 is assigned by classifier 8 to one or multiple classes 3a through 3c of a predefined classification 3.

According to block 131, group 7 of locations 6* may be ascertained for example by clustering based on at least one hypothesis for the presence of an object.

According to block 132, based on group 7, further locations 6 may be selected for which it is plausible that object 4 characterized by group 7 has reflected radar radiation from there. According to block 141, also for these locations 6, portions 5** of frequency spectrum 5 may then be ascertained, and according to block 151 these may be included in the aggregation.

According to block 161, locations 6*, 6** for which portions 5*, 5** of frequency spectrum 5 have been aggregated, and/or further features of radar reflexes received from these locations 6*, 6**, are fed to classifier 8 together with these portions 5*, 5** of frequency spectrum 5.

Within box 170, a few examples are indicated as to how these two different types of information may be jointly processed in classifier 8.

According to block 171, portions 5*, 5** of frequency spectrum 5 may be fed to a first neural network in classifier 8. According to block 171a, this first neural network may in particular be a convolutional neural network for example.

According to block 172, locations 6*, 6**, or the further features of the radar reflexes, may be fed to a second neural network in classifier 8. According to block 172a, this second neural network may in particular be a neural network having a PointNet architecture.

According to block 173, the first neural network and the second neural network may merge with one another in classifier 8. In particular, as explained above, the information may for example first be brought separately to a similar level of abstraction in both networks, before being jointly processed in the merged part.

According to block 174, portions 5*, 5** of frequency spectrum 5 may be fed to a first layer of a neural network in classifier 8. According to block 175, locations 6*, 6**, or the further features of the radar reflexes, may be fed to a deeper layer of the same neural network. As explained above, the levels of abstraction of the two types of data may again be aligned here before both types of data are jointly processed.

According to block 176, portions 5*, 5** of frequency spectrum 5 on the one hand and locations 6*, 6**, or the further features of the radar reflexes, on the other hand, may be simultaneously fed to classifier 8 in different channels of one and the same input. The entire processing of the two types of data then takes place synchronously in classifier 8.

In step 180, the assignment of object 4 to one or multiple classes 3a through 3c may be further processed to form an activation signal 180a. In step 190, a vehicle 50 may be controlled using this activation signal 180a.

FIG. 2 illustrates the relationship between locations 6* on an object 4, here a vehicle 50, and portions 5* of frequency spectrum 5 that are aggregated and fed to classifier 8. For each location 6*, there is a corresponding point 6' in the coordinates of frequency spectrum 5. A rectangular (here: square) detail is cut out as portion 5* around each of these corresponding points 6'.

In addition, locations 6* themselves, or further features of the radar reflexes, may also be fed to classifier 8 and processed jointly with portions 5*.

What is claimed is:

1. A method for classifying objects based on measured data recorded by at least one radar sensor, comprising the following steps:
providing a frequency spectrum of time-dependent measured data of the radar sensor;
ascertaining, from the frequency spectrum, locations from which reflected radar radiation has reached the radar sensor;

performing a clustering by which a group of the locations is determined to belong to one and the same object;

based on the determination of the group, performing the following:

ascertaining, for each location that is part of the group, a respective portion of the frequency spectrum that corresponds to the radar radiation reflected from the respective location;

aggregating and feeding to a classier all of the portions ascertained for all of the locations of the group; and assigning the object, by the classifier, to one or multiple classes of a predefined classification based on the fed portions.

2. The method as recited in claim 1, wherein the clustering is based on at least one hypothesis for a presence of the object.

3. The method as recited in claim 1, wherein, based on the group that has been determined, further locations of the ascertained locations are selected as being plausible as being part of the object characterized by the group, and, based on the selection of the further locations, additional portions of the frequency spectrum that correspond to the radar radiation reflected from the further locations are ascertained and included in the aggregation.

4. The method as recited in claim 2, wherein the locations for which portions of the frequency spectrum have been aggregated, and/or further features of the reflected radar radiation received from the locations for which the portions of the frequency spectrum have been aggregated, are fed to the classifier together with the aggregated portions of the frequency spectrum.

5. The method as recited in claim 1, wherein the frequency spectrum is provided as a distance-speed representation.

6. The method as recited in claim 5, wherein the measured data is recorded using radar radiation of a modulation type Joint Sampling Frequency Modulated Continuous Wave (JSFMCW), and an ambiguity regarding speed is resolved using an additional piece of information.

7. The method as recited in claim 1, wherein, for the each location that is part of the group, the ascertaining of the respective portions of the frequency spectrum that corresponds to the radar radiation reflected from the respective location includes selecting, for the respective location, a respective rectangular area of coordinates of the frequency spectrum that bounds a coordinate corresponding to the respective location.

8. The method as recited in claim 4, wherein:

the portions of the frequency spectrum are fed to a first neural network in the classifier;

the locations or the further features are fed to a second neural network in the classifier; and output of the first neural network and output of the second neural network are merged in a joint network of the classifier to produce the assignment.

9. The method as recited in claim 8, wherein:

a convolutional neural network is selected as the first neural network, and/or a neural network having a PointNet architecture is selected as the second neural network.

10. The method as recited in claim 4, wherein (a) the portions of the frequency spectrum, and (b) the locations of the group or the further features of the reflected radar radiation, are simultaneously fed to the classifier in different respective channels of one and the same input.

11. The method as recited in claim 4, wherein the portions of the frequency spectrum are fed into a neural network by input to a first layer of the neural network in the classifier, and the locations or the further features of the reflected radar radiation are fed into the same neural network by input to a deeper layer of the same neural network.

12. The method as recited in claim 1, wherein the portions of the frequency spectrum are transformed into at least one distance-speed representation before being fed to the classifier.

13. The method as recited in claim 12, wherein an ambiguity regarding speed in the at least one distance-speed representation is resolved using an additional piece of information.

14. The method as recited in claim 1, further comprising:

forming an activation signal based on the assignment to the one or multiple classes as ascertained by the classifier; and controlling a vehicle using the activation signal.

15. A non-transitory machine-readable data medium on which is stored a computer program for classifying objects based on measured data recorded by at least one radar sensor, the computer program, when executed by one or more computers, causing the one or more computers to perform the following steps:

providing a frequency spectrum of time-dependent measured data of the radar sensor;

ascertaining, from the frequency spectrum, locations from which reflected radar radiation has reached the radar sensor;

performing a clustering by which a group of the locations is determined to belong to one and the same object;

based on the determination of the group, performing the following:

ascertaining, for each location that is part of the group, a respective portion of the frequency spectrum that corresponds to the radar radiation reflected from the respective location;

aggregating and feeding to a classier all of the portions ascertained for all of the locations of the group; and assigning the object, by the classifier, to one or multiple classes of a predefined classification based on the fed portions.

16. A computer configured to classify objects based on measured data recorded by at least one radar sensor, the computer configured to:

provide a frequency spectrum of time-dependent measured data of the radar sensor;

ascertain, from the frequency spectrum, locations from which reflected radar radiation has reached the radar sensor;

perform a clustering by which a group of the locations is determined to belong to one and the same object;

based on the determination of the group, perform the following:

ascertain, for each location that is part of the group, a respective portion of the frequency spectrum that corresponds to the radar radiation reflected from the respective location;

aggregate and feeding to a classier all of the portions ascertained for all of the locations of the group; and assign the object, by the classifier, to one or multiple classes of a predefined classification based on the fed portions.

* * * * *